(12) United States Patent
Samek

(10) Patent No.: US 7,538,511 B2
(45) Date of Patent: May 26, 2009

(54) MODULAR TROLLING MOTOR CONTROL SYSTEM

(75) Inventor: David M. Samek, Eagle Lake, MN (US)

(73) Assignee: Johnson Outdoors Inc., Mankato, MN (US)

( * ) Notice: Subject to any disclaimer, the term of this patent is extended or adjusted under 35 U.S.C. 154(b) by 37 days.

(21) Appl. No.: 11/654,139

(22) Filed: Jan. 17, 2007

(65) Prior Publication Data

US 2008/0169779 A1   Jul. 17, 2008

(51) Int. Cl.
*G05D 1/00*   (2006.01)
(52) U.S. Cl. .................... 318/588; 318/551; 318/548; 440/6; 440/84
(58) Field of Classification Search .............. 318/588, 318/551, 548; 440/6, 84
See application file for complete search history.

(56) References Cited

U.S. PATENT DOCUMENTS

| | | | |
|---|---|---|---|
| 3,958,524 A * | 5/1976 | Cantley et al. .............. 114/146 |
| 5,172,324 A | 12/1992 | Knight |
| 5,202,835 A | 4/1993 | Knight |
| 5,386,368 A | 1/1995 | Knight |
| 5,446,846 A * | 8/1995 | Lennartsson ................. 710/100 |
| 5,469,150 A * | 11/1995 | Sitte .......................... 340/3.42 |
| 5,491,636 A | 2/1996 | Robertson et al. |
| 5,525,081 A * | 6/1996 | Mardesich et al. ............. 440/6 |
| 5,610,815 A * | 3/1997 | Gudat et al. ................... 701/23 |
| 5,832,440 A | 11/1998 | Woodbridge et al. |
| 5,884,213 A * | 3/1999 | Carlson ...................... 701/206 |
| 5,931,110 A | 8/1999 | Yamamoto |
| 6,273,771 B1 * | 8/2001 | Buckley et al. ............... 440/84 |
| 6,678,589 B2 | 1/2004 | Robertson et al. |
| 6,885,919 B1 | 4/2005 | Wyant et al. |
| 6,986,688 B1 | 1/2006 | Jansen |
| 6,995,527 B2 | 2/2006 | DePasqua |

\* cited by examiner

*Primary Examiner*—Lincoln Donovan
*Assistant Examiner*—Thai Dinh
(74) *Attorney, Agent, or Firm*—Kinney & Lange, P.A.

(57) ABSTRACT

A trolling motor control system includes plurality of modules that are connected to a communication bus to transmit and receive data used in controlling operation of a trolling motor. Based upon data transmitted over the bus, trolling motor speed, steering, and trim can be controlled. The modules can include motor controller modules, foot pedal modules, compass and GPS modules, RF modules for wireless control, battery metering modules, diagnostic modules, accessory device driver modules, power trim controller modules, and power steering controller modules.

14 Claims, 3 Drawing Sheets

MODULAR TROLLING MOTOR CONTROL SYSTEM

BACKGROUND OF THE INVENTION

The present invention relates to trolling motors. In particular, the present invention relates to a modular control system including multiple modules connected in a network over a communication bus for controlling operation of a trolling motor.

Fishing boats are often equipped with a trolling motor for providing a relatively small amount of thrust to slowly and quietly propel the boat while the operator is fishing. Most outboard trolling motors are battery powered and are mounted to either the bow or the stern of the boat.

Trolling motors can be manually operated using a tiller to rotate the trolling motor in order to steer the boat, and to control the speed of the trolling motor. Other trolling motors make use of a wired foot pedal to control steering, to turn the propeller on and off, and to control the trolling motor speed. Wireless controls have also been developed using wireless communication from a foot pedal or from a small hand held remote control to provide control of steering, speed, and propeller on/off condition.

Automatic navigation control systems have also been developed for trolling motors. Examples of automatic steering and positioning controls are shown in the Knight, U.S. Pat. Nos. 5,172,324; 5,202,835 and 5,386,368.

Control systems for controlling the operation of a trolling motor have become more sophisticated and more complex. Typically, each additional feature has required incorporation of additional hardware within the housing of the trolling motor, or a new dedicated connector in order to connect an accessory to the trolling motor.

BRIEF SUMMARY OF THE INVENTION

A modular trolling motor control system includes a plurality of modules that are connected to a multidrop communication bus, so that data can be shared among the modules by transmitting and receiving data over the bus. The modules include at least one motor controller module that controls operation of the trolling motor based upon data received over the bus, and at least one user interface module for receiving user inputs and providing data over the bus based upon those user inputs.

In one embodiment, the modular trolling motor control system includes one module that acts as a master to control the communication over the bus. Each module that is connected to the bus has a unique address, so that each module can be communicated with individually, while other devices can monitor the communication.

The modules of the trolling motor control system can include a motor controller module, a compass module, a GPS module, an RF control module, a foot pedal module, a battery meter module, a power trim controller module, a power steering module, a diagnostic module and other accessory modules. The modules can be added or removed from the system as desired.

DETAILED DESCRIPTION

Figure 1:
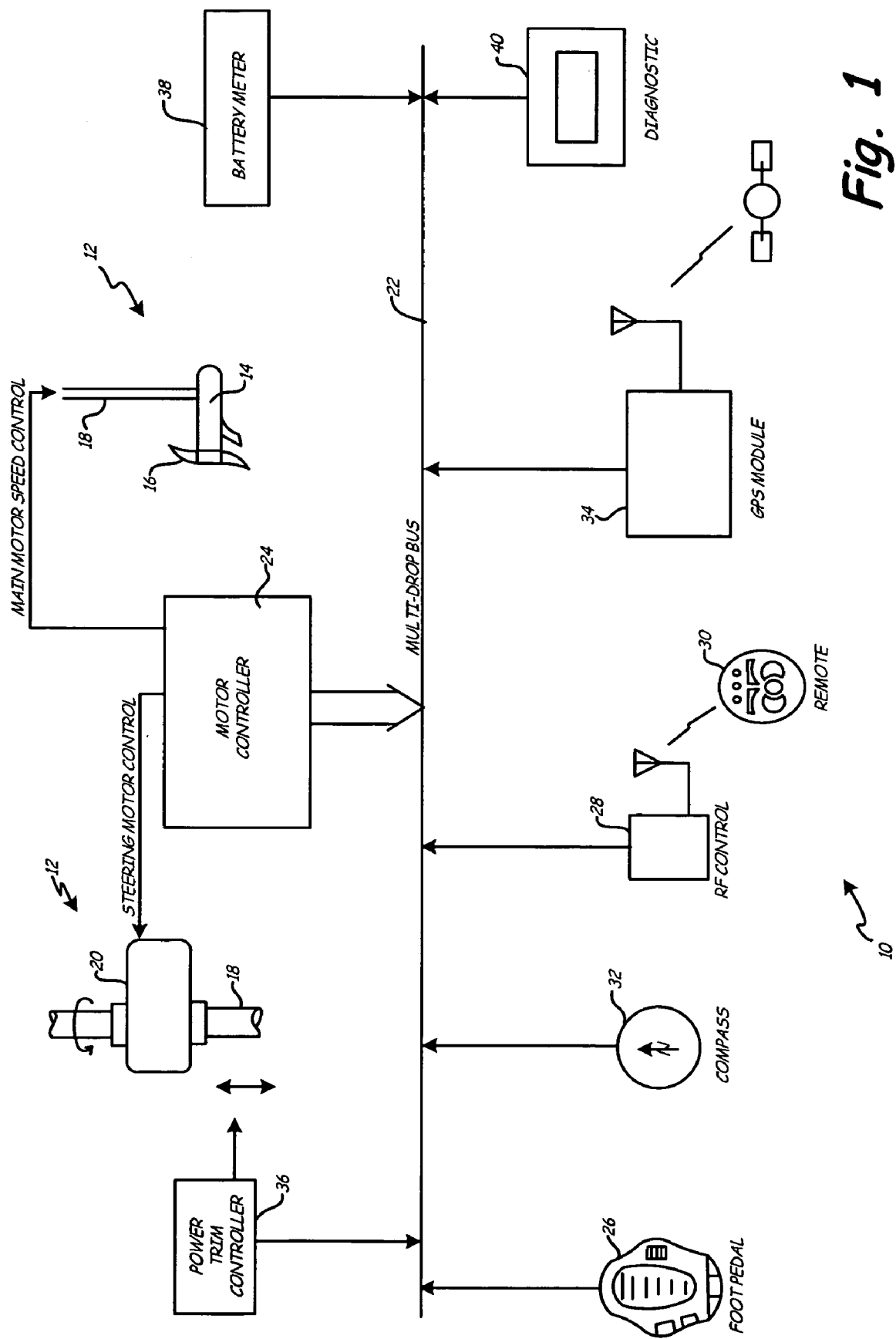
FIG. 1 shows a block diagram of one embodiment of a modular trolling motor control system.

FIG. 1 shows a block diagram of modular trolling motor control system 10, which controls the operation of electric trolling motor 12. As shown in FIG. 1, trolling motor 12 includes main thrust motor 14 with propeller 16, shaft 18 and steering motor 20. Main motor 14 is mounted at the lower end of shaft 18. Steering motor 20 rotates shaft 18 to turn main motor 14 to direct thrust in order to steer the boat.

Modular system 10 is a networked system, in which modules are connected to multidrop communication bus 22. In the embodiment shown in FIG. 1, control system 10 includes motor controller module 24, foot pedal module 26, RF control module 28, remote control 30, compass module 32, GPS module 34, power trim controller module 36, battery meter module 38, and diagnostic module 40.

Communication bus 22 is, for example, an RS 485 bus that provides bi-directional communication among the modules that are connected to it. Each module has a connector or multiple connectors that allow that module to be connected to bus 22.

Each module connected to bus 22 has a unique address. That address is needed so that each module can be spoken to individually. At the same time, other modules can listen to what is communicated over bus 22. All of the modules on bus 22 are capable of both transmitting and receiving data.

Power to the individual modules can be provided by separate connection to the battery system on the boat. Preferably, power is provided to each of the modules over bus 22, which simplifies and reduces the number of electrical connections required.

Each module can be added or removed from bus 22 at any time. The addition or removal of a module can take place either with power present on bus 22, or with bus 22 powered down.

There can be one or more master devices on bus 22, and one or more slave devices. Usually, there will be one module that acts as the master of the network, and the remaining modules will act as slaves.

The network master sends out commands or requests for data to slave devices periodically. The frequency of these requests for data can vary depending on the function and the purpose of the particular module being addressed. Typical time periods range from about 1 millisecond to 1 second intervals.

The network master maintains a list of the modules that are active on bus 22. When a module is added or removed, the network master knows what has been added or removed, and sends out future requests for data accordingly.

In the embodiment shown in FIG. 1, motor controller module 24 controls the operation of both main motor 14 and steering motor 20 of trolling motor 12. The control of the propeller on/off and speed functions and the steering motor functions are based upon user inputs from foot pedal 26 and from remote control 30 through RF control module 28. Motor controller module 24 will request and process user input data received from foot pedal module 26 and RF control 28, and will determine whether user inputs from foot pedal module 26 or user inputs from remote control 30 will be used to control main motor speed and steering.

Remote control 30 includes user input buttons through which the user can select automatic navigation modes. These modes can include, for example, an automatic navigation or Autopilot mode, a Record Track mode, a Track To Start mode, a Track To End mode and a Spot Lock mode. Each of these operating modes require data from compass module 32 and GPS module 34.

In the Autopilot mode, motor controller module 24 uses data received from compass module 32 to control steering motor 20 in order to maintain the same compass heading. In the Record Track mode, motor controller module 24 periodically stores GPS waypoint data as the boat moves along a track steered by the user. When the Record Track mode is complete, motor controller module 24 has a set of waypoints with which the user can then select a Track To Start or Track To End mode. In the Track To Start mode, motor controller 24 uses GPS position data from GPS module 34 to control steering motor 20 so that the boat moves along the track defined by the stored waypoints until it reaches the first or starting waypoint. In the Track To End mode, motor controller module 24 uses GPS data from GPS module 34 to control steering motor 20 so that the boat moves along a track defined by the stored waypoints until the last recorded or end waypoint is reached. In the Spot Lock mode, motor controller 24 uses data from GPS module 34 and compass module 32 to control steering motor 20 in order to maintain the boat at a stored GPS waypoint.

Power trim controller 36 includes a motor or actuator that raises and lowers main motor 14. Power trim controller 36 may respond to commands from remote control 30 that are transmitted wirelessly to RF control module 28, and then are communicated over bus 22.

Battery meter module 38 monitors the state of charge of the batteries that power trolling motor 12. Battery meter module 38 may also include a display, or the display may be a part of another device connected on bus 22. For example, battery charge information may be provided over bus 22 to RF control module 28, and then sent wirelessly to remote control 30 to provide a visual or audible warning signal. Similarly, one of the other modules, such as border controller module 24, may include a visual or audible annunciator to warn the user of low battery power based upon data received from battery meter 38.

Diagnostic module 40 is connected to bus 22 to monitor the operation and condition of other modules of the network. Diagnostic module 40 can provide indications of detected malfunction or other issues based upon data that is communicated over bus 22.

Other devices can be added to control system 10 as an additional module. The additional of another module, such as an accessory device driver module, simply requires connection to multidrop bus 22. No rewiring of any of the other modules is required. Nor are additional ports or connectors required to any of the other modules as the result of the addition of another module to the system.

In one embodiment, motor controller module 24 acts as the network master. Most communications involve data that will be used by motor controller module 24 in controlling either steering motor 20 or main motor 14 of trolling motor 12.

Figure 2:
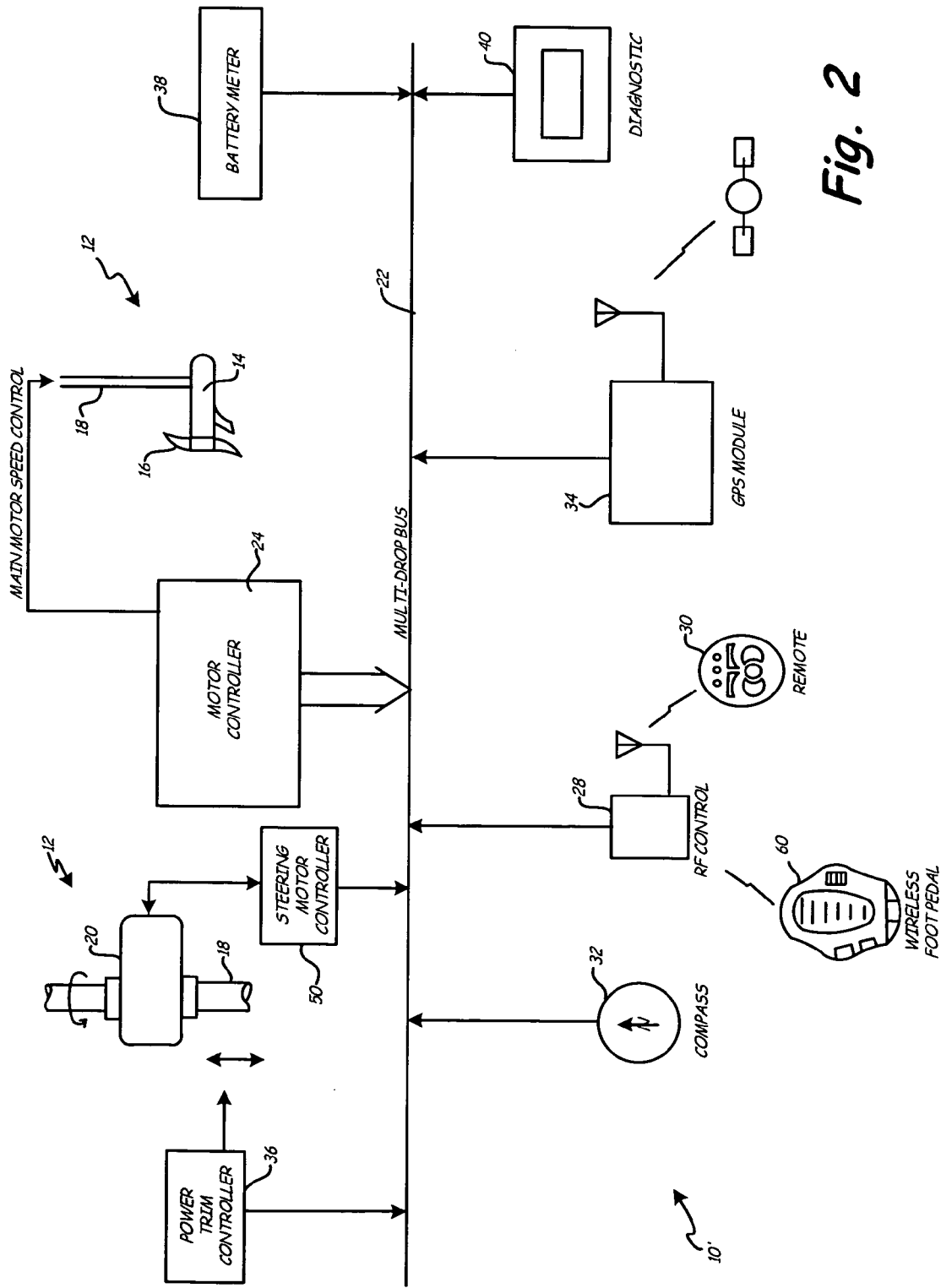
FIG. 2 shows a block diagram of another embodiment of a modular trolling motor control system.

FIG. 2 shows modular trolling motor control system 10' which is generally similar to system 10 shown in FIG. 1 with two exceptions. First, motor controller module 24 controls only the operation of main motor 14 in the embodiment shown in FIG. 2. Steering motor 20 of trolling motor 14 is controlled instead by power steering controller module 50. Second, foot pedal module 26 of FIG. 1 has been replaced in FIG. 2 by wireless foot pedal 60. In FIG. 2, RF control module 28 receives wireless signals from both remote control 30 and wireless foot pedal 60.

Figure 3:
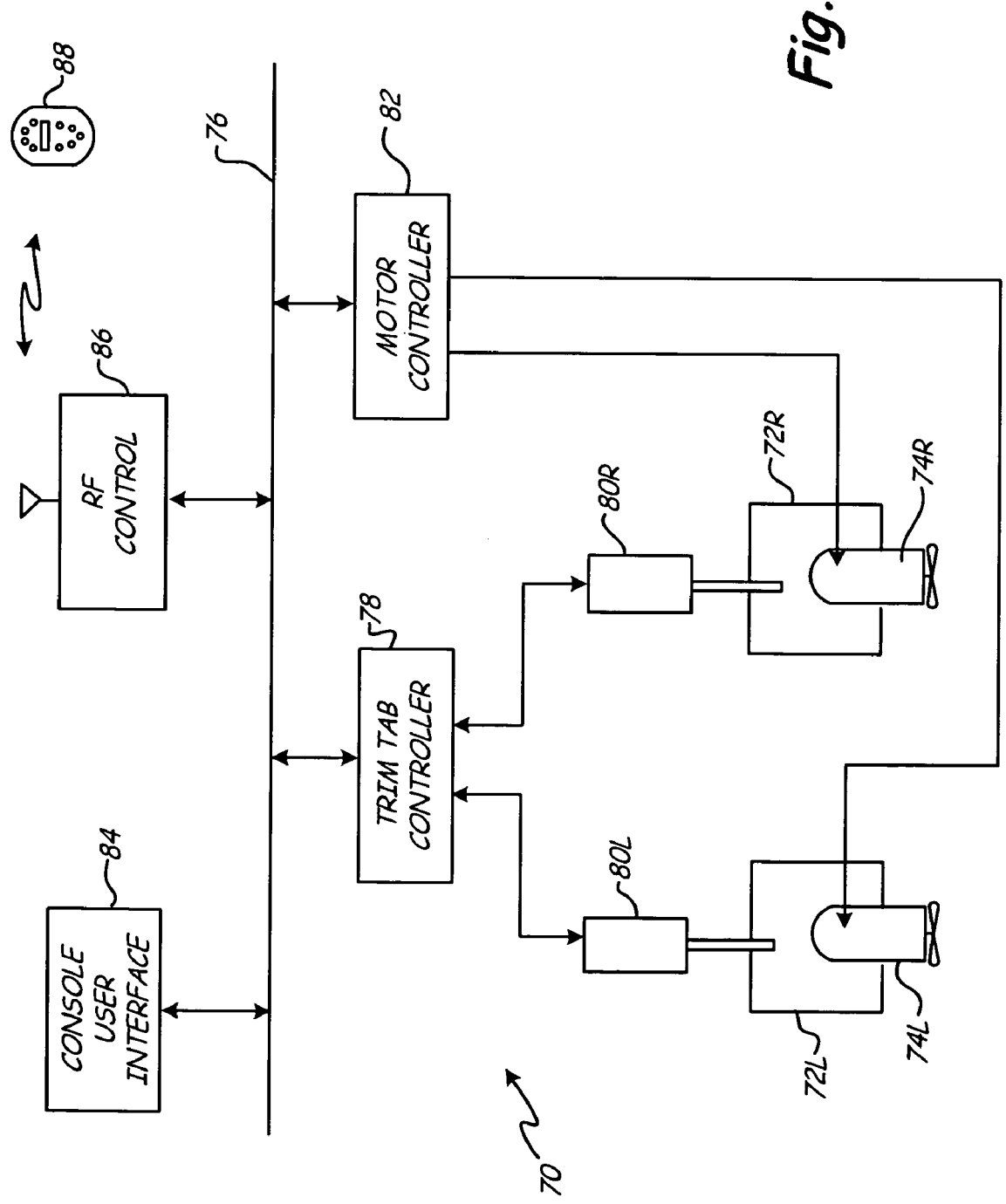
FIG. 3 shows a block diagram of an embodiment of a modular trolling motor control system for trim tab mounted trolling motors.

FIG. 3 shows modular trolling motor control system 70 for controlling position of left and right trim tabs 72L and 72R mounted on the transom of a boat, and left and right trolling motors 74L and 74R mounted on trim tabs 72L and 72R, respectively. Control system 70 includes communication bus 76, trim tab controller module 78, trim tab actuators 80L and 80R, motor controller module 822, console user interface module 84, RF control module 86, and remote control 88.

Actuators 80L and 80R are used to raise and lower trim tabs 72L, 72R and trolling motors 74L, 74R. User inputs to control operation of trim tabs 72L, 72R and trolling motors 74L, 74R are provided through a console mounted user interface module 84, or remote control 88 through RF control module 86.

Trim tab controller module 78 controls operation of actuators 80L and 80R based upon commands received over bus 76 from console user interface module 84 or RF control module 86. When trimming is desired, actuators 80L and 80R can be individually or jointly operated. When trolling is desired, actuators are controlled jointly so that both trolling motors 74L and 74R are positioned at the same depth.

Motor controller module 82 controls motors 74L and 74R based upon commands from remote control 88 through RF control module 86. Console user interface module 84 may also be a source of motor control commands. Motor controller module can turn each motor on or off, can control speed of each motor, and can control steering using motors 74L and 74R. Steering is achieved by controlling the relative speed and propeller direction of trolling motors 74L, 74R.

Although the present invention has been described with reference to preferred embodiments, workers skilled in the art will recognize that changes may be made in form and detail without departing from the spirit and scope of the invention.

The invention claimed is:

1. A modular trolling motor system comprising:
   a trolling motor;
   a trolling motor communication bus; and
   a plurality of modules connected to the trolling motor communication bus and capable of transmitting and receiving data over the trolling motor communication bus relating to control of operation of the trolling motor, the modules including:
      a motor controller module for controlling operation of the electric trolling motor based upon data received over the bus, wherein the motor controller module controls at least one of steering and speed of the electric trolling motor; and
      a user interface module for receiving user inputs for controlling the trolling motor;
   wherein each module includes a bus connector to allow it to be connected to the bus;
   wherein the bus is a serial data bus;
   wherein electrical power is supplied to modules through the bus connectors;
   wherein the motor controller module acts as a network master to periodically request data from other modules connected to the bus; and
   wherein the network master maintains a listing of modules connected to the bus, and wherein each module has a unique address on the bus.

2. The system of claim 1 wherein the plurality of modules includes:
   a compass module for providing compass heading data.

3. The system of claim 2 wherein the plurality of modules includes:
   a GPS module for providing positioning data.

4. The system of claim 3 wherein the motor controller module controls steering of the trolling motor based upon the compass heading data and the positioning data.

5. The system of claim 1 wherein the user interface module includes:
   a RF control module for communicating with a remote control device.

6. The system of claim 1 wherein the user interface module includes:
   a foot pedal module for providing data representing foot pedal generated user input commands.

7. The system of claim 1 wherein the plurality of modules includes:
   a battery meter module for monitoring state of charge of a battery power source for the trolling motor.

8. The system of claim 1 wherein the plurality of modules includes:
   a power trim controller module for raising and lowering the trolling motor based on data received over the bus.

9. The system of claim 1 wherein the plurality of modules includes:
   a power steering module for turning the trolling motor based upon data received over the bus.

10. The system of claim 1 wherein the plurality of modules includes:
    a diagnostic module for monitoring activity of the system and diagnosing system issues based upon data received over the bus.

11. A modular trolling motor system comprising:
    an electric trolling motor including an electric thrust motor, a propeller driven by the electric thrust motor, a shaft connected at a lower end to the electric thrust motor, and an electric steering motor for rotating the shaft to control orientation of the electric thrust motor;
    a trolling motor communication bus; and
    a plurality of modules connected to the trolling motor communication bus and capable of transmitting and receiving data over the trolling motor communication bus, the modules including:
    one or more modules for controlling operation of the electric thrust motor and the electric steering motor based upon data received over the bus; and
    a user interface module for receiving user inputs for controlling the trolling motor;
    wherein the one or more modules includes a motor controller for controlling operation of the electric thrust motor;
    wherein each module includes a bus connector to allow it to be connected to the bus;
    wherein the bus is a serial data bus;
    wherein electrical power is supplied to modules through the bus connectors;
    wherein the motor controller module acts as a network master to periodically request data from other modules connected to the bus; and
    wherein the network master maintains a listing of modules connected to the bus, and wherein each module has a unique address on the bus.

12. The system of claim 11, wherein the plurality of modules includes:
    a compass module for providing compass heading data; and
    a GPS module for providing positioning data;
    wherein the motor controller module controls steering of the trolling motor based upon the compass heading data and the positioning data.

13. The system of claim 11, wherein the motor controller module also controls the electric steering motor.

14. The system of claim 11, wherein the one or more modules includes a power steering module for controlling the electric steering motor.

* * * * *

UNITED STATES PATENT AND TRADEMARK OFFICE
CERTIFICATE OF CORRECTION

PATENT NO.        : 7,538,511 B2                                          Page 1 of 1
APPLICATION NO.   : 11/654139
DATED             : May 26, 2009
INVENTOR(S)       : David M. Samek It is certified that error appears in the above-identified patent and that said Letters Patent is hereby corrected as shown below:

Column 1, Line 15, delete "stem", insert --stern--

Signed and Sealed this

Ninth Day of March, 2010

David J. Kappos
*Director of the United States Patent and Trademark Office*